United States Patent [19]
Jakobs

[11] 3,899,281
[45] Aug. 12, 1975

[54] VIBRATOR APPARATUS, ESPECIALLY FOR PRODUCING LARGE SHAPED CARBON MEMBERS

[75] Inventor: Willy Jakobs, Porz-Grengel, Germany

[73] Assignee: Klockner-Humboldt-Deutz Aktiengesellschaft, Cologne, Germany

[22] Filed: Mar. 26, 1973

[21] Appl. No.: 344,600

[30] Foreign Application Priority Data
Mar. 24, 1972 Germany............................ 2214352

[52] U.S. Cl. .................. 425/432; 248/22; 425/456
[51] Int. Cl............................ B29b 1/08; B29c 1/16
[58] Field of Search ...... 425/432, 456, 421; 248/21, 248/22

[56] References Cited
UNITED STATES PATENTS

| | | |
|---|---|---|
| 2,179,959 | 11/1939 | Schroedter........................ 248/22 X |
| 2,407,168 | 9/1946 | Lindkvist........................ 425/456 X |
| 2,636,719 | 4/1953 | O'Connor........................ 425/456 X |
| 2,706,112 | 4/1955 | Carrier............................ 248/21 X |
| 2,819,060 | 1/1958 | Neidhart.......................... 248/22 X |
| 3,160,376 | 12/1964 | Kennedy et al...................... 248/22 |
| 3,235,244 | 2/1966 | Hein ................................ 248/22 X |
| 3,277,551 | 10/1966 | Sekiguchi.......................... 425/253 |
| 3,347,502 | 10/1967 | Gwinn................................ 248/22 |
| 3,447,671 | 6/1969 | Schweinfurth.................... 248/22 X |
| 3,545,706 | 12/1970 | Harshman ....................... 248/21 X |

Primary Examiner—Robert L. Spicer, Jr.
Attorney, Agent, or Firm—Herbert L. Lerner

[57] ABSTRACT

Vibrator apparatus for producing cast members of granular material includes a foundation, a vibratory table having an oscillating drive, spring means for vibratorily mounting the vibratory table on the foundation, and a molding box connected to the vibratory table, the spring means being disposed between the vibratory table and the foundation so that, in direction of vibration, the spring means are at least partly stressed in shear.

3 Claims, 5 Drawing Figures

VIBRATOR APPARATUS, ESPECIALLY FOR PRODUCING LARGE SHAPED CARBON MEMBERS

The invention relates to a vibrator apparatus for producing shaped or cast members of granular masses, especially for producing electrodes for the aluminum industry, and more particularly such vibrator apparatus which has a vibrator table provided with an oscillating drive and mounted vibratorily by means of preferably rubber-elastic spring members on a foundation, and a mold box connectible with the vibrator table.

A molding machine for producing concrete shaped members is known from U.S. Pat. No. 3,277,551 and corresponds in basic principle with the aforedescribed vibrator apparatus. In this heretofore known molding machine, there is provided a vibrator table which oscillates or vibrates in vertical direction through rubber springs stressed in compression and tension and supported on a foundation frame. This heretofore known vibrator molding machine has considerable disadvantages, however, because, when such machine has very large dimensions, which are necessary, for example, for producing carbon electrodes having weights of from 1 to 3 tons, it is very difficult to effect an adequately soft spring-mass adjustment with rubber springs stressed in compression and tension. As described in the aforementioned patent, such a weak spring support calls for additional guide members in order to avoid nodding oscillations about a horizontal axis or rotary oscillations about a vertical axis. Such added guide members represent critical points for vibratory machines, however, with regard to constructional cost and operational reliability. For conventional rather high vibrating frequencies, that are, for example, in ranges between 20 and 50 Hz, the guides are permitted to have only slight tolerances. This is scarcely able to be effected satisfactorily for very large machines because of manufacturing technology limitations, so that there is the danger that the lateral guides will wear and flatten out or be deflected in a very short time, and consequently an accurate guidance of the vibratory table and, accordingly, an adequately accurate maintenance of the shape of the manufactured cast or formed member is no longer assured.

It is therefore an object of the invention to provide a vibrator apparatus for producing formed or cast members which avoids the foregoing disadvantages of the aforementioned heretofore known machines of this general type.

With the foregoing and other objects in view, there is provided, in accordance with the invention, vibrator apparatus for producing cast members of granular material comprising a foundation, a vibratory table having an oscillating drive, spring means for vibratorily mounting the vibratory table on the foundation, and a molding box connected to the vibratory table, the spring means being disposed between the vibratory table and the foundation so that, in direction of vibration, the spring means are at least partly stressed in shear. With the aid of such a spring arrangement, there is assured also for very weak springmass adjustments, as are necessary for conventional supercritical operation of a vibratory apparatus, that the guidance of the vibratory table is effected by the spring members themselves exclusively in vertical i.e., oscillating or vibrating direction. This is true especially for the normally employed spring members of rubber or similar materials having substantially square-shaped configurations, because such members for corresponding dimensioning in direction of shear have a smaller spring constant than for a compressive stress in an axial direction extending perpendicularly thereto. Such springs, for an at least partial oscillating stress in shear i.e., in direction of the smaller spring constant, assume in addition to their function as energy storage devices for the oscillating or vibrating movement, also reliably the guidance of the vibratory table in direction of oscillation or vibration, periodic disruptive forces in direction transverse to the oscillating or vibrating direction being effectively suppressed due to the damping characteristics of the material of the springs.

In accordance with another feature of the invention, the spring means, which is preferably rubber-elastic, comprises a plurality of spring members that are inclined at an angle of between 30° and 90°, preferably less than 45°, with respect to the plane of the foundation. The size of the angle of inclination for the spring members is determined by the size of the oscillating mass, on the one hand, and by the ratio of the spring constant in compression and tension directed to the spring constant in direction of shear of the spring members, on the other hand, and can thus be adjusted to an optimal spring-mass ratio for the desired operating frequency, with regard to the given size of the oscillating masses, the disruptive forces transverse to the oscillating or vibrating direction, the damping characteristics of the particular spring member that is used, and the like.

In accordance with a further feature of the invention, respective pairs of the spring members form a spring unit, the members of each pair being mutually inclined symmetrically so that the unit has the shape of a peaked roof. This construction is advantageous, in that each spring unit independently meets the objective of the spring members as energy storage device and the simultaneous objective of a guide member. In this manner, it is possible to establish the spring-mass adjustment optimal for a given vibratory table, by a simple variation in the number of spring units; each spring unit simultaneously contributing independently to the required lateral guidance.

Other features which are considered as characteristic for the invention are set forth in the appended claims.

Although the invention is illustrated and described herein as embodied in vibrator apparatus, especially for producing large shaped carbon members, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which.

Figure 1:
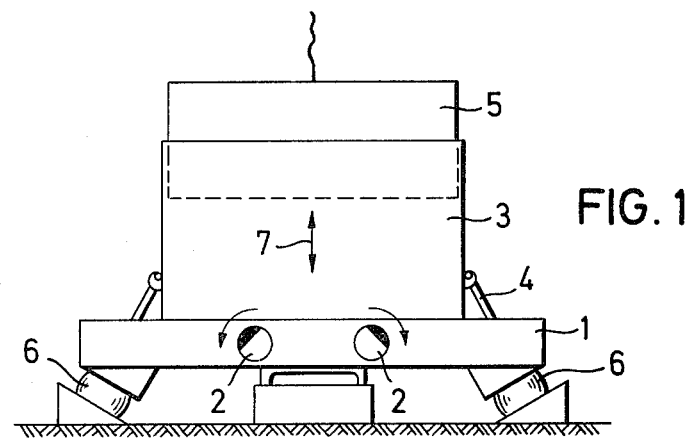
FIG. 1 is a diagrammatic view of a vibrator apparatus for producing carbon electrodes constructed in accordance with the invention.

Referring now to the drawing, and first particularly to FIG. 1 thereof, there is shown therein the vibrator apparatus of the invention which includes a vibrator table 1 that is provided with an oscillating or vibrating drive formed of two counterrotating unbalance weights. The unbalance weights 2 are driven by non-illustrated drive motors with intermediate connection of cardan or flexible drive shafts. A molding box 3 is seated on the vibrator table 1 and is firmly connected by tension members 4 to the vibrator table 1. To produce carbon electrodes, the molding box 3 is filled with a predetermined quantity of electrode mass or material. After the molding box 3 has been filled, with the aid of a non-illustrated conventional lifting apparatus, a covering weight 5 is placed in the molding box 3 on top of the electrode material with which the box 3 has been filled, which accordingly shapes the free surface of the electrode material contained in the molding box 3 and also, because of the weight thereof, intensifies the packing or compressing action effected by the vibrating process. The vibrator table 1 is vibratingly mounted with spring members 6 of rubber on a foundation so that, during operation, the vibrator table 1 oscillates vertically, as shown by the double-headed arrow 7, because of the forces acting in vertical direction which are periodically produced by the counterrotating unbalance weights 2.

In accordance with the invention, the spring members 6 of the embodiment of FIG. 1 are so disposed between the vibrator table 1 and the foundation that they are partially subjected to shearing stress. This is achieved in the simplest manner in the embodiment by disposing the spring members 6 at an angle inclined with respect to the plane of the foundation. Due to this disposition of the spring members 6, there is produced from the combined stressing of the spring members, both in the direction of acting tension stress as well as in the direction of acting shear stress i.e., parallel to the bearing surface or seat of the spring members 6, very good guidance of the vibrator table 1 in vertical i.e., vibrating, direction, so that stationary guide members extending in vertical direction, such as guide rails, railroller combinations or the like, can be dispensed with. Undesired nodding or rotary oscillations about an axis disposed perpendicularly to the direction of vibration indicated by the arrow 7 are thereby virtually precluded.

Figure 2:
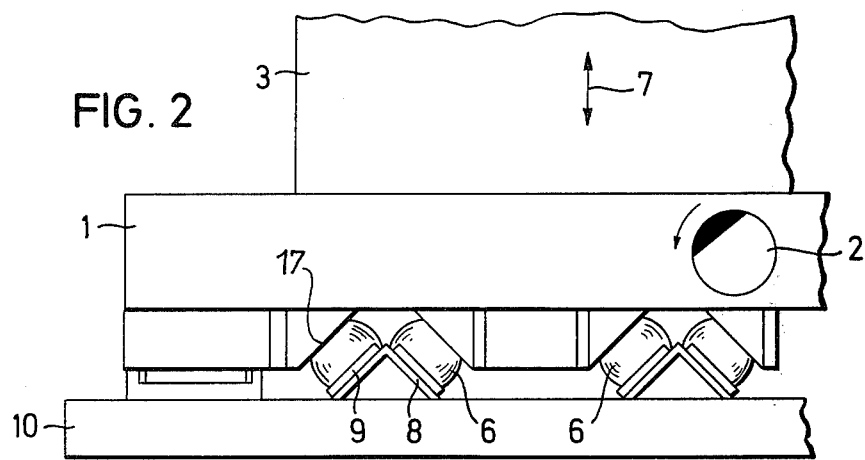
FIG. 2 is a fragmentary enlarged view of another embodiment of FIG. 1 having a vibrator table with a special spring disposition.
Figure 3:
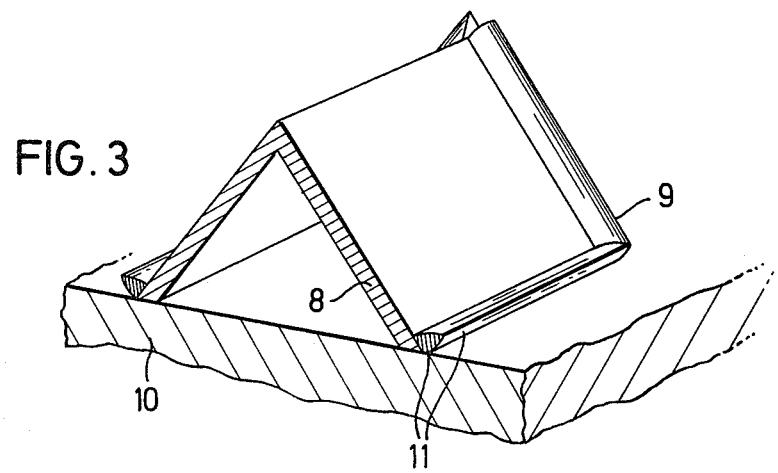
FIG. 3 is a fragmentary enlarged perspective view of FIG. 2 showing a holder device for one of the springs thereof.

In FIG. 2 there is shown an embodiment of the invention having a different disposition of the spring members than that of the embodiment of FIG. 1. FIG. 2 discloses a corner of a vibrator table 1 as well as part of a molding box 3 firmly mounted on the vibrator table 1. In the embodiment of FIG. 2, pairs of spring members 6 are combined into respective spring units wherein the spring members 6 of each unit are inclined symmetrically to one another in the shape of a peaked roof or inverted V. In addition thereto, there is advantageously provided on the foundation in accordance with the invention, a holding device 8 for each of the spring members 6 which is formed of a box-shaped support member having an upper surface that is constructed as a bearing or contact surface for the respective spring member 6 and is laterally enclosed or surrounded by a supporting frame 9. In the fragmentary enlarged view of the FIG. 2 embodiment shown in FIG. 3, for each spring unit that is formed of a respective pair of spring members 6, the holding device 8 is formed of a roof-shaped angle section secured by any suitable means, such as welding, for example, to a foundation frame 10, the upper surfaces of the angle section as viewed in FIG. 3, forming two bearing surfaces that are mutually inclined and serve to support respective rubber spring members 6 as shown in FIG. 2

The edges of the angle section of the holding device 8 are provided with a support frame formed, in accordance with the invention, of round or half-round profiled members 11, or the like. The surface of the rubber springs 6 is thereby advantageously protected from damage. This construction permits the usually somewhat square-shaped rubber spring members 6 to be inserted loosely into the box-shaped holding device, and then to lay the vibrator table 1, which has correspondingly inclined opposing surfaces 17, loosely on the respective spring members 6. Relatively simplified assembly and relatively easy replacement of damaged spring members 6 are thereby accomplished. The weight of the vibratory table 1 together with the filled molding box seated thereon and further loaded with the covering weight 5 is so heavy that it will not lift off during operation. Due to the fact that the spring members 6 or spring units either extend parallel (FIG. 1) or perpendicular (FIG. 2) to the lateral edges of the vibratory table 1, assurance is provided that the vibrator table 1 will not be displaced horizontally.

By loosely inserting the rubber spring members 6 into the holding device, an advantage is moreover attained that the spring-mass system can be readily adjusted in that the respective square-shaped spring members 6 can be shortened in length by cutting off part thereof and thereby reducing the value of the spring constant thereof. The aforedescribed construction of the box-shaped holding device can also be employed advantageously, with suitable modification, for a vibrator apparatus as shown in FIG. 1.

Figure 4:
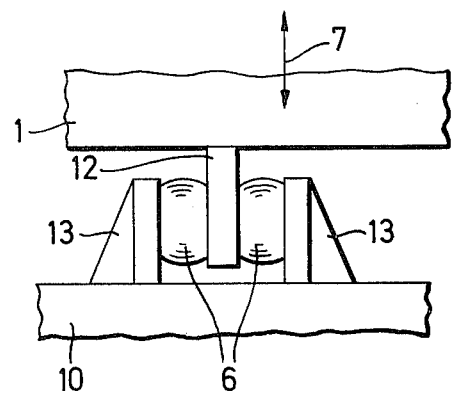
FIGS. 4 and 5 are respective fragmentary enlarged views, FIG. 5 moreover in section, of yet other embodiments of the invention having different spring dispositions.

In FIG. 4, there is shown a spring construction within the scope of the invention wherein the spring members 6 are fully stressed in shear. In the embodiment of FIG. 4, respective crosspieces or bridges 12 are suitably secured to the vibrator table 1 parallel or perpendicular to the edge thereof. These crosspieces are clamped between rubber spring members 6 with the aid of two paws or jaws 13 that are clampable transversely to the direction of oscillation of the vibrator table 1, as shown by the doubleheaded arrow 7, the paws 13 are being rigidly connected to the foundation frame 10. In this way, the crosspiece 12 is firmly retained between the rubber springs 6 by friction. Due to this disposition of the spring members for a vibrator table, in accordance with the invention, even when large disruptive forces in horizontal direction are applied, a reliable lateral guidance of the vibrator table solely by the spring members and without additional guide members is assured. It is necessary only to establish that the adjustment of the oscillations or vibrations in horizontal direction i.e., the ratio of the total spring constants in horizontal direction to the oscillating or vibrating total mass with regard to the disruptive forces does not lie within a critical frequency range.

Figure 5:
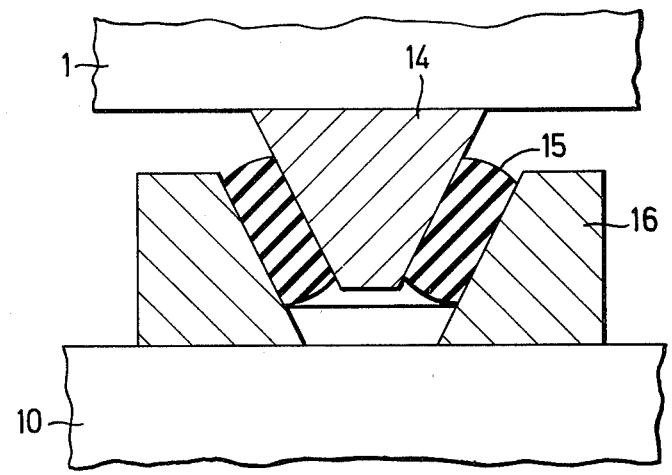

In FIG. 5, there is shown partly in section and in enlarged fragmentary view, another embodiment of the invention wherein for a respective spring unit, a conical support member 14 is connected to the vibrator table 1 and is insertable into a holder device 16 secured to the foundation frame 10 and formed with a corresponding conical recess, a ring-shaped rubber spring 15 having suitably matching conical outer surfaces being disposed around the conical support member 14 so as to be disposed between the latter and the conical surface of the holder device 16 which defines the recess formed therein. Of course, it is also within the scope of the invention to connect the conical support member 14 to the foundation frame 10 instead of to the vibrator table 1, and to secure the holder device 16 conversely to the vibrator table 1 instead of to the foundation frame 10. As is readily apparent from FIG. 5, in this construction of the invention, the rubber spring 15 is also stressed primarily in shear in the direction of oscillation or vibration, so that a "soft" adjustment of the spring-mass system is able to be effected rather easily. Since the spring member has a very high spring constant transversely to the direction of oscillation or vibration, good lateral guidance is afforded without any additional guiding devices.

I claim:

1. In vibrator apparatus for producing cast members of granular material comprising a foundation, a vibratory table having an oscillating drive, solid elastic spring means for vibratorily mounting said vibratory table on said foundation, and a molding box connected to said vibratory table; wherein said spring means are disposed between said vibratory table and said foundation so that, in direction of vibration, said spring means are at least partly stressed in shear, said spring means comprising a plurality of pairs of spring members that are inclined at an angle of between 30° and 60° with respect to the plane of said foundation, each of said respective pairs of said spring members forming a spring unit, the members of each pair being mutually inclined symmetrically so that the unit has the shape of a peaked roof, the members of each pair being held in position by force of gravity.

2. Vibrator apparatus according to claim 1 including a holder device for said spring members, respectively, disposed on said foundation, said holder device comprising a box-shaped support member having an upper contact surface for the respective spring member, and a support frame laterally surrounding said upper contact surface.

3. Vibrator apparatus according to claim 2, wherein said support frame is formed with surfaces facing toward the respective spring member seated on said upper contact surface, which are at least partly curved.

* * * * *